US006987575B1

(12) United States Patent
Maess et al.

(10) Patent No.: US 6,987,575 B1
(45) Date of Patent: Jan. 17, 2006

(54) PRINTING DEVICE WHICH OPERATES WITH AT LEAST THREE BRIGHTNESS STEPS AND METHODS TO BE EXECUTED THEREWITH FOR DETERMINING PRINTING PARAMETERS

(75) Inventors: Volkhard Maess, Erding (DE); Martin Schleusener, Zorneding (DE)

(73) Assignee: Oce Printing Systems, GmbH, (DE)

( * ) Notice: Subject to any disclaimer, the term of this patent is extended or adjusted under 35 U.S.C. 154(b) by 0 days.

(21) Appl. No.: 09/868,827

(22) PCT Filed: Dec. 21, 1999

(86) PCT No.: PCT/EP99/10247

§ 371 (c)(1),
(2), (4) Date: Jun. 20, 2001

(87) PCT Pub. No.: WO00/38406

PCT Pub. Date: Jun. 29, 2000

(30) Foreign Application Priority Data

Dec. 21, 1998 (DE) .................................. 198 59 140

(51) Int. Cl.
*G06F 15/00* (2006.01)
(52) U.S. Cl. ...................... 358/1.1; 358/300; 358/302; 347/132; 347/140; 399/47; 399/48; 399/49; 399/50; 399/51; 399/52
(58) Field of Classification Search ................. 358/1.1, 358/300, 302; 399/52, 51; 347/132, 140
See application file for complete search history.

(56) References Cited

U.S. PATENT DOCUMENTS

| 4,709,250 | A | * | 11/1987 | Takeuchi ..................... 347/131 |
| 4,780,731 | A | * | 10/1988 | Creutzmann et al. ....... 347/237 |
| 4,794,413 | A | * | 12/1988 | Yamazaki et al. ........... 347/247 |
| 4,855,766 | A | * | 8/1989 | Suzuki ........................ 347/246 |
| 5,057,867 | A | * | 10/1991 | Ishigaki et al. ................ 399/43 |
| 5,124,732 | A | * | 6/1992 | Manzer et al. .............. 347/140 |
| 5,153,609 | A | * | 10/1992 | Ando et al. ................. 347/129 |
| 5,235,175 | A | * | 8/1993 | Mayer ...................... 250/208.2 |
| 5,241,347 | A |   | 8/1993 | Kodama ...................... 399/49 |
| 5,309,177 | A | * | 5/1994 | Shoji et al. ................. 347/131 |
| 5,367,361 | A | * | 11/1994 | Henderson ................... 399/31 |
| 5,646,717 | A | * | 7/1997 | Hiroshima et al. .......... 399/154 |
| 5,694,223 | A |   | 12/1997 | Katori et al. ................ 358/300 |
| 5,734,948 | A |   | 3/1998 | Nagayama et al. ........... 399/46 |
| 5,767,888 | A |   | 6/1998 | Schleusener et al. ........ 347/130 |

(Continued)

FOREIGN PATENT DOCUMENTS

DE            43 43 274 A1      7/1994

(Continued)

*Primary Examiner*—Edward Coles
*Assistant Examiner*—Mark R. Milia
(74) *Attorney, Agent, or Firm*—Schiff Hardin LLP

(57) ABSTRACT

The invention relates to a method for operating an electrophotographic printing device (10). A multilevel character generator (22) is used in said printing device (10). Correction parameters (K1, K2, K3) are determined for light coding values (1, 2 and 3) such that a high-quality printed image can he obtained also in the instance of modified printing conditions.

26 Claims, 6 Drawing Sheets

U.S. PATENT DOCUMENTS

Figure 1:
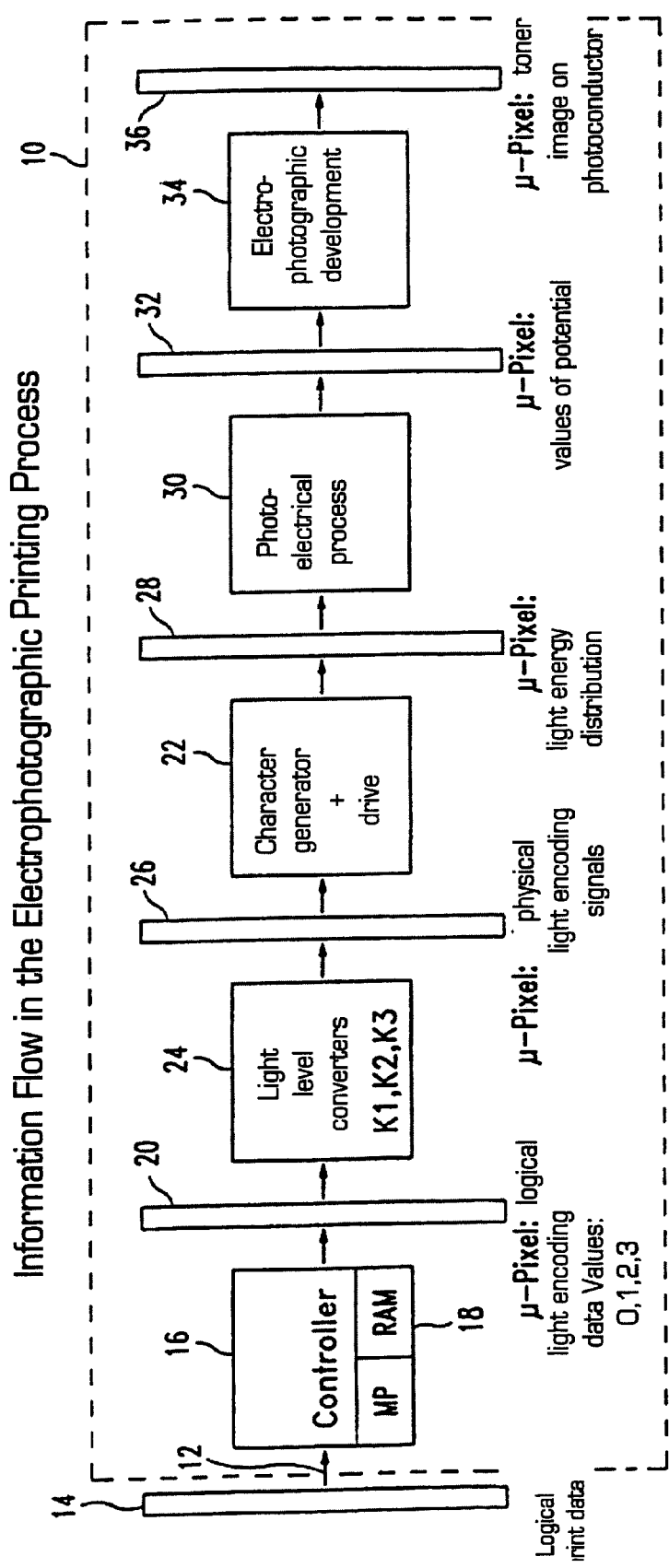

| | | | | |
|---|---|---|---|---|
| 5,856,814 A | * | 1/1999 | Yagyu | 345/89 |
| 5,877,846 A | | 3/1999 | Tahara et al. | 355/67 |
| 5,973,795 A | * | 10/1999 | Iida | 399/59 |
| 6,037,922 A | * | 3/2000 | Yagyu | 345/89 |
| 6,167,210 A | * | 12/2000 | Maess et al. | 399/50 |
| 6,339,441 B2 | * | 1/2002 | Suzuki | 347/133 |
| 6,433,804 B1 | * | 8/2002 | Maess et al. | 347/132 |

FOREIGN PATENT DOCUMENTS

| | | |
|---|---|---|
| EP | 0 858 205 A1 | 8/1998 |
| WO | WO 97/37285 | 10/1997 |

* cited by examiner $$V_D(K,T,H) = (V_C - V_{LIM}) \cdot \exp(-K \cdot T \cdot H) + V_{LIM} \quad [1]$$

$$K(V_D,T,H) = \frac{1}{T \cdot H} \cdot \ln\left(\frac{V_C - V_{LIM}}{V_D - V_{LIM}}\right) \quad [2]$$

$$H(V_D,K,T) = \frac{1}{T \cdot K} \cdot \ln\left(\frac{V_C - V_{LIM}}{V_D - V_{LIM}}\right) \quad [3]$$

with:
- $V_C$: photoconductor charge potential in V
- $V_D$: photoconductor discharge potential in V
- $V_{LIM}$: lowest obtainable discharge potential in V
- H: illumination in µWs/cm²
- T: photoconductor temperature in °C
- K: photoconductor sensitivity factor in cm²/(µWs °C)

Fig.4

PRINTING DEVICE WHICH OPERATES WITH AT LEAST THREE BRIGHTNESS STEPS AND METHODS TO BE EXECUTED THEREWITH FOR DETERMINING PRINTING PARAMETERS

The invention is directed to a method for the operation of an electrophotographic printer or copier device as well as to printer devices for the implementation of the methods [sic].

US Letters Patent 5,767,888 discloses a method wherein an optical character generator generates a charge image composed of a plurality of charge regions on a photoconductor with at least one light source. The size and shape of the charge regions is influenced by the illumination energy emitted by the light source. Light encoding data are generated from the print data of a print image, said light encoding data respectively containing one of at least three different light encoding values and then being employed for the drive of the light source.

In contrast to traditional bi-level character generators, character generators driven with more than two light encoding values are referred to as multi-level character generators and contain, for example, an LED line or a multi-plane laser. Although there are more than two light encoding values given multi-level character generators, there are ultimately only printed or non-printed surfaces. Compared to bi-level character generators, however, multi-level character generators offer the possibility of designationally defining the size and shape of the charge regions in order to produce the impression of different gray scale values for someone who views the developed charge image. Such a multi-level character generator is disclosed by US Letters Patent U.S. Pat. No. 5,767,888, which is part of the disclosure of this application.

What is disadvantageous about the known printing with multi-level character generators is that the print quality sinks given changing printing conditions. For example, these printing conditions include the age of the photoconductor and the quality of the toner or, respectively, developer. Methods with which print images having good quality can be printed even given modified printing conditions are employed for printers with bi-level character generators, see, for example, the methods set forth in WO 97/37285. However, the quality that is still adequate for printer devices with bi-level character generator does not always meet the significantly higher demands and possibilities that derive given employment of a multi-level character generator.

Further methods for the operation of an electrographic printer or copier device are known from U.S. Pat. No. 5,694,223, WO 97/37285, DE 43 43 274 A1, U.S. Pat. No. 5,734,948 and U.S. Pat. No. 5,241,347.

An object of the invention is to specify a method for the operation of an electrophotographic printer or, respectively, copier device with multi-level character generator with which print images having high print quality can also be printed given changing printing conditions. Further, printer devices with which such methods can be implemented are to be specified.

This object is achieved by a method having the method steps indicated in patent claim 1. Developments are indicated in the subclaims.

The invention proceeds from the consideration that a multi-level character generator enables a high printing quality due to the plurality of different illumination energy values. However, the different illumination energy values can also be utilized for influencing the printing event in a way different from previously. In the inventive method, illumination energy values that are corrected in a balancing procedure and that respectively belong to a light encoding value are therefore used in the inventive method. By employing the corrected illumination energy values, new degrees of freedom for influencing the printing event derive given the inventive method.

The inventive method also proceeds from the perception that a print characteristic for the overall print event indicating the relationship of light encoding values and toner deposit is essentially defined by a photoconductor discharge characteristic of the photoconductor discharge process and by a development characteristic for the electrophotographic development process. The discharge characteristic indicates the relationship of potential on the photoconductor and toner deposit. Examples of these characteristics are explained in the aforementioned US Letters Patent U.S. Pat. No. 5,767,888. In addition to the current discharge characteristic, the current development characteristic for a predetermined printing characteristic should be taken into consideration by selecting suitable, corrected illumination energy values.

The corrected illumination energy values are defined such in the inventive method that the printing characteristic has a predetermined curve even given deviations of the current photoconductor discharge characteristic and a reference photoconductor discharge characteristic. For example, the reference characteristics are established shortly after manufacture of the printed. The printing characteristic is prescribed such that a high-quality print image derives.

In one development, the discharge characteristic and/or the developing characteristic are influenced by the variation of printing parameters that the predetermined curve of the printing characteristic is also achieved when additional conditions limit the free selection of the corrected illumination energy values.

When it is essentially only the discharge characteristic of the photoconductor that changes during the service life of the printer or, respectively, copier, then it suffices to give priority consideration to the influence thereof on the printing event. In the inventive method, the discharge characteristic present at the point in time of printing is taken into consideration in order to determine the corrected illumination energies for the light encoding values such that the influence of changes of the discharge characteristic on the printing event are compensated.

In developments of the inventive methods, correction parameters are determined that have values deviating from one another due to the non-linear discharge characteristic and that are a criterion for the deviation of the current discharge characteristic from a rated discharge characteristic of the photoconductor at a potential that belongs to the reference illumination energy value allocated to the respective light encoding value according to the rate discharge characteristic. The corrected illumination energies are then calculated, for example by multiplication of the reference illumination energy values by the respective correction parameter.

In one development of the methods according to the first or second aspect of the invention, the discharge characteristic is acquired completely or at points. This ensues by measurements at the photoconductor. In addition to the temperature of the photoconductor, for example, a discharge potential that occurs given a predetermined illumination energy is acquired. Subsequently, parameters can be determined in a characteristics equation that approximately reproduces the curve of the characteristic of the photoconductor present at the printing time. On the other hand, however, a number of points of the illumination characteristic can be acquired between which the characteristic is interpolated. In this development, a photoconductor potential that should arise on the photoconductor given the respective light encoding value is prescribed for each light encoding value. A corrected illumination energy is determined for each light encoding value with the assistance of the predetermined potential and the discharge characteristic.

In another development, the discharge characteristic is likewise determined. However, photoconductor potentials are not prescribed for all light encoding values but, for example, for only one light encoding value. The corrected illumination energy or, respectively, correction factor can then be determined from the illumination characteristic for only this light encoding value. The other corrected illumination energy values or, respectively, correction factors for the other light encoding values are then determined by approximations that, for example, are already stored in tables. This method can be implemented fast and simply.

In another development of the inventive methods, th discharge characteristic is taken into consideration in at least one regulating or control event. The respective correction parameter is determined such that a potential predetermined for the light encoding value or, respectively, a potential lying close to this potential arises on the photoconductor given an illumination according to the light encoding value and appertaining correction parameter. For example, a method with a PID regulator (proportional, integral, differentiating regulator) is employed as regulating method. No approximation for the characteristic need be prescribed given employment of a regulating or, respectively, control method.

In a development of the method according to the second aspect, a development characteristic is likewise taken into consideration in the determination of the corrected illumination energy values or, respectively, correction parameters and/or further printing parameters. As a result of this measure, the conditions of the development process are taken into consideration in the determination of the correction parameters in addition to the current conditions of the illumination or, respectively, discharge process.

In a development of the inventive methods, the development characteristic is determined upon employment of the corrected illumination energies. Toner marks. preferably raster toner marks, are employed for the determination of the development characteristic. The employment of raster toner marks, wherein a toner region has checkerboard-like or stripe-like toner-free or, respectively, toner-covered regions, assures that the presentation of image details is also taken into consideration.

The balancing event is automatically implemented, preferably after a printer or, respectively, copier device is turned on, after longer printing pauses, after a longer printing operation and/or on demand of an operator. It is to be assumed that the printing conditions have changed precisely at these points in time.

The invention is also directed to printer or, respectively, copier devices with which the inventive methods or, respectively, their developments can be implemented. The aforementioned technical effects thus also apply to the printer devices.

Figure 2:
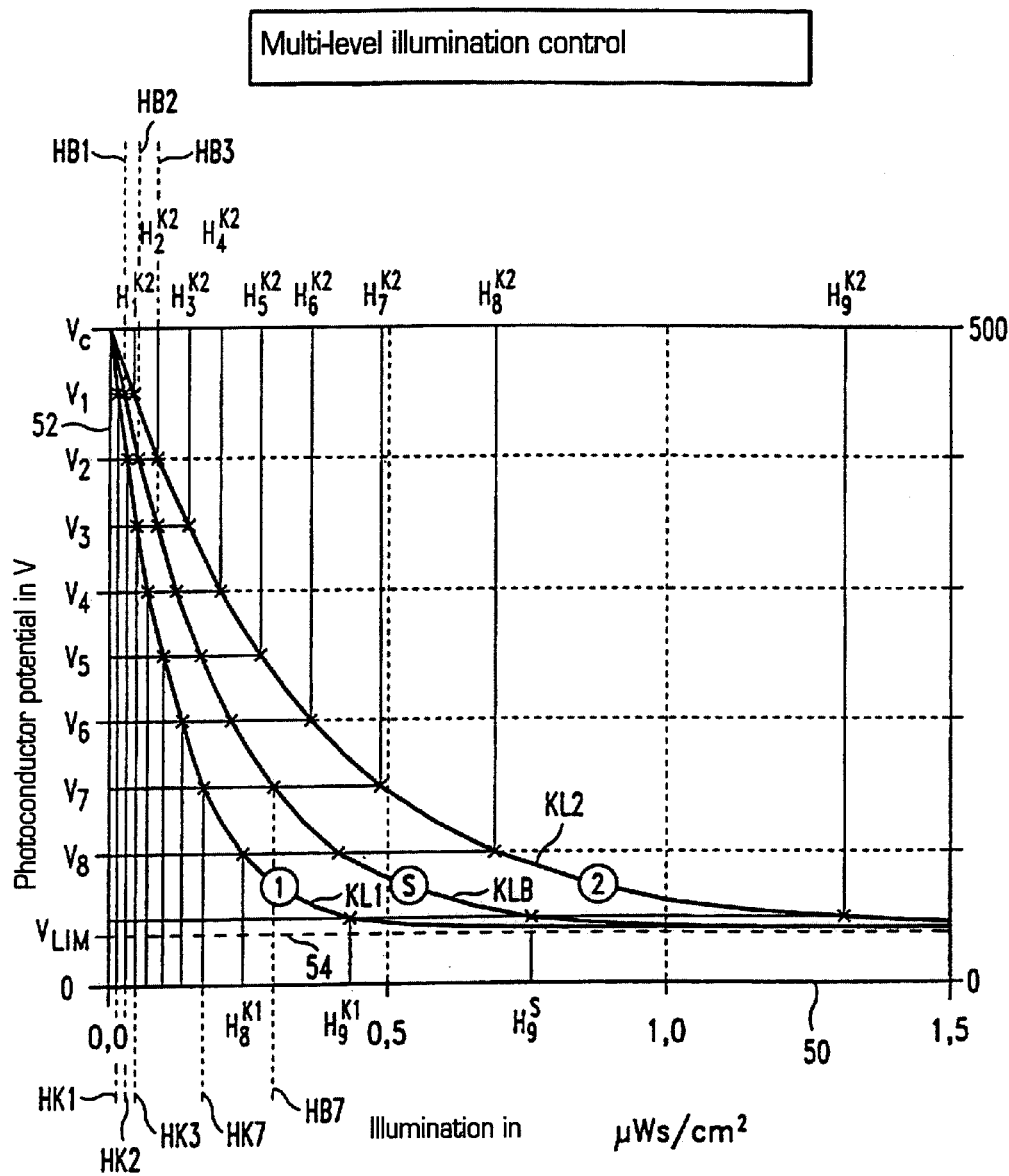
Figure 3:
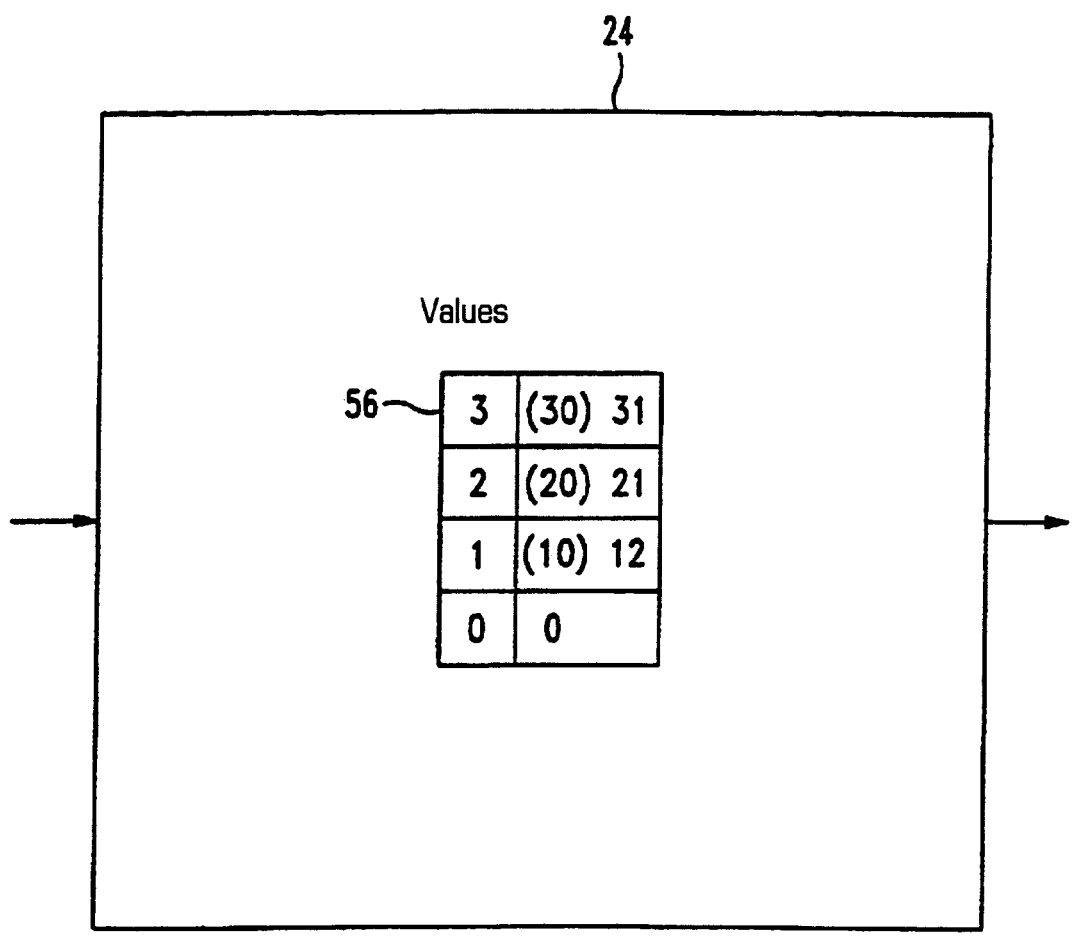
Figure 5:
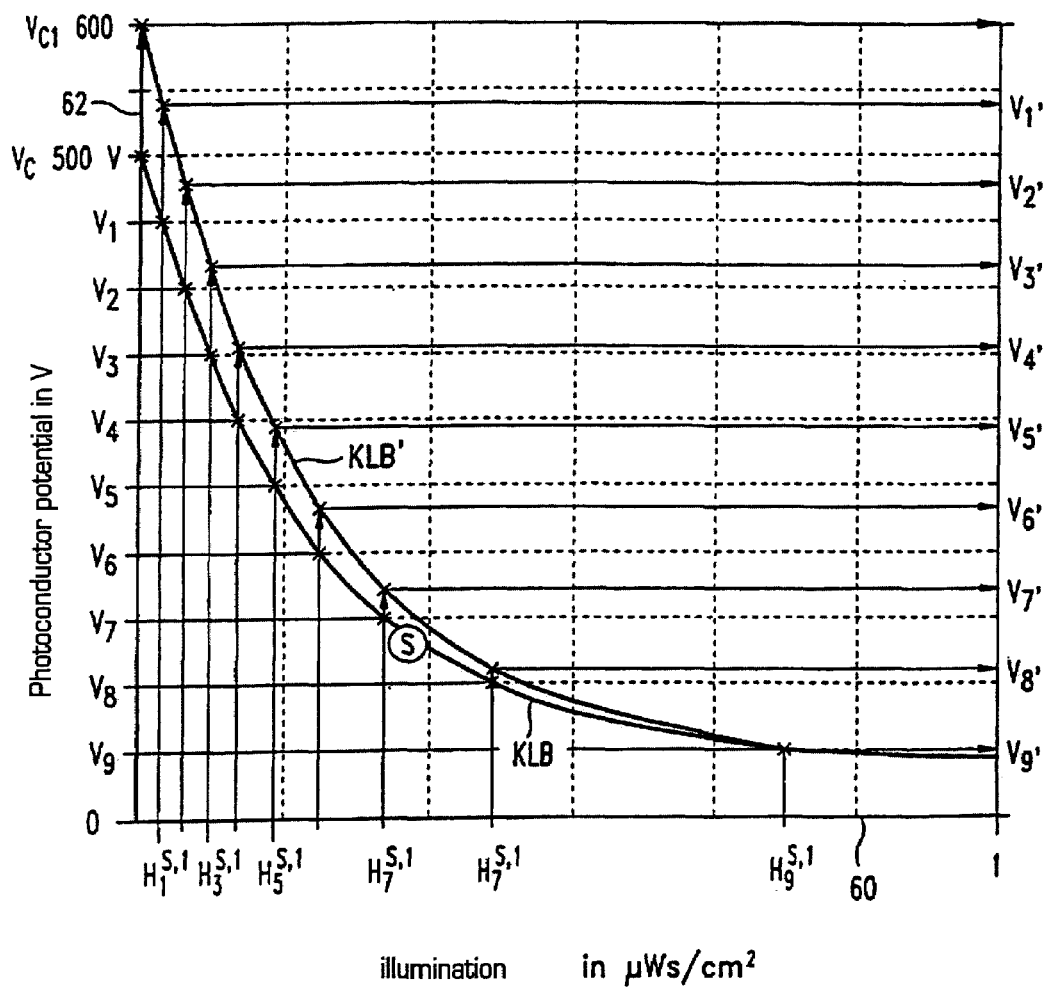

Exemplary embodiments of the invention are explained below on the basis of the attached drawings. Shown therein are:

FIG. 1 a schematic illustration of a printing event;
FIG. 2 a potential/illumination energy diagram;
FIG. 3 a conversion and correction unit;
FIG. 4 equations for the approximation of a photoconductor characteristic;
FIG. 5 another potential/illumination energy diagram; and
FIG. 6 a four-quadrant diagram with characteristics of the printing event.

FIG. 1 shows a schematic illustration of a printing event as well as the information flow when printing in an electrophotographic printer or copier device 10. Print data 14 that define a print image, for example according to the known postscript format, are input in the printer device 10 via an electronic interface 12. A print data unit 16 contains a microprocessor MP that processes a conversion program stored in a memory 18. The print data unit 16 generates light encoding data 20 for the individual LEDs (light-emitting diode) of a character generator 22 from the print data 14. The light encoding datum for an LED is stored in two bits of a data word. There are thus four light encoding values LCW with the values 0, 1, 2 and 3. No illumination is carried out given the light encoding value LCW=0. Given the light encoding value LCW=1, illumination is carried out such that the respective LED emits a reference illumination energy HB1 under reference printing conditions in a reference printing event characterized by the reference printing conditions. The light encoding value LCW=2 or, respectively, LCW=3 leads to reference illumination energies HB2 or, respectively, HB3 in the reference printing event.

The light encoding data 20 are processed in a conversion and correction unit 24 that is explained in greater detail below with reference to FIG. 3. Before printing begins, three correction factors K1, K2 and K3 have been determined in the conversion and correction unit 24. For example, the correction factors K1, K2 and K3 are automatically determined after every activation of the printer and/or after a longer print [sic] or, respectively, after a longer printing operation. The method steps that are thereby implemented are explained in greater detail below on the basis of FIG. 2. A light encoding signal 26 is determined in the conversion and correction unit 24 dependent on the light encoding value of the light encoding data. Given the light encoding value LCW=0, a light encoding signal is generated that leads to no illumination by the appertaining LED. Given the light encoding value LCW=1, a light encoding signal 26 is generated that—taking the correction factor K1 into consideration—effects an illumination with a corrected illumination energy HK1. Given the light encoding value LCW=2 or, respectively, LCW=3, a light encoding signal 26 is generated that—taking the correction factor K2 or, respectively, K3 into consideration—leads to an illumination with a corrected illumination energy HK2 or, respectively, HK3.

The light encoding signals 26 are employed for the drive of the character generator 22. The character generator 22 contains a drive circuit for the LEDs of an LED line (not shown) wherein neighboring LEDs have a spacing of approximately 42 $\mu$m from one another. Macro-cells are respectively generated by three LEDs arranged sequentially when illuminating three successive lines. Light energy distributions 28 emitted by the LEDs of a macro-cell partially superimpose. Given a suitable selection of the light encoding values, light distribution hills of different light intensity that lead to a distribution 32 of potential on a photoconductor 30 similar to the respective light distribution arise within a raster cell. What is achieved by defining a threshold of potential in a developing unit 34 is that toner regions 36 with different diameters determined by the respective potential distribution form in the macro-cells. A half-tone image is thus generated in a simple way by employing the light encoding values. This methods are set forth in detail in US Letters Patent U.S. Pat. No. 5,767,888, which is a constituent part of the disclosure of the present application.

FIG. 2 shows a potential/illumination energy diagram on whose abscissa axis 50 the illumination energy is eroded [sic] in $\mu$Ws/cm$^2$ and on whose ordinate axis 52 the photoconductor potential is eroded [sic] in volts. Before the beginning of the illumination, the photoconductor is respectively charged to a charge potential VC of 500 V. A reference characteristic KLB shows the relationship of potential on the photoconductor and illumination energy for a reference photoconductor that is employed in the reference printing event. A characteristic KL1 of a photoconductor employed for printing at the moment deviates from the reference characteristic KLB. The deviations of the characteristics KLB and KL1 are to be attributed, for example, to the temperature or to the age of the photoconductor. Deviations of the characteristics KLB and KL1, however, also arise given a change of the photoconductor or, respectively, when comparing the photoconductors of two different printer devices 10. In this case, manufacture-conditioned fluctuations as well as the quality of the photoconductors have an additional influence on the deviation of the characteristics KLB and KL1.

A further characteristic KL2 shows the dependency of the potential on a third photoconductor on the illumination energy. Qualitatively, the characteristics KLB, KL1 and KL2 have a similar curve, so that only the curve of the characteristic KLB shall be explained below. With increasing illumination energy, the values of potential on the photoconductor drop according to a descending exponential function until a lowest obtainable discharge potential VLIM is finally reached, illustrated with a broken line 54.

The printing event leads to print images with high print quality when the potentials that are generated upon occurrence of the various light encoding values LCW=0, 1, 2 or, respectively, 3 have an approximately uniform spacing from one another and are distributed over the entire discharge region that is available.

However, only potentials in the upper region of the discharge curve are taken into consideration in the following explanation in order to simplify the explanations. For example, the potential V1 should be generated given the light encoding value LCW=1. A potential V2 or, respectively, V3 should be generated given the light encoding value 2 or, respectively, 3. The potentials V1 through V3 and the reference characteristic KLB define the reference illumination energies HB1 through HB3.

The determination of the correction factors K1 through K3 ensues in the same way and is explained below on the basis of a correction factor K7. A potential V7 should be generated on the photoconductor given a light encoding value LCW=7.

Given employment of a photoconductor with the reference characteristic KLB, this requires a reference illumination HB7. Given employment of a photoconductor with the characteristic KL1, a corrected illumination energy HK7 can be determined for the potential V7 from the characteristic KL1. When the reference illumination energy HB7 is divided by the corrected illumination energy HK7, then a correction factor K7 having a value of approximately 0.6 derives.

In the conversion and correction unit 24, the correction factor K7 leads thereto that a light encoding signal for the corrected illumination energy HK7 is generated instead of a light encoding signal for the reference illumination energy HB7. Even given a photoconductor having a modified characteristic KL1 compared to the characteristic KLB, the potential V7 is thus generated given the light encoding value 7. The illumination process and, thus, the entire printing process as well are not influenced by the variation of the characteristic of the photoconductor.

Correction factors K1' through K9' derive for the characteristic KL2 in a similar way. The correction factors K1' through K9', however, have values greater than 1.

FIG. 3 shows the conversion and correction unit 24, which contains a memory 56. A microprocessor (not shown) reads light level values from an appertaining memory cell dependent on the light encoding value to be respectively processed. In the exemplary embodiment being explained, there are 32 light levels 0 through 32 [sic] with which the character generator 22 can be driven for the four light encoding values 0 through 3. Without correction factors K1 through K3, the light level value 0 belongs to the light encoding value 0, the light level value 10 belongs to the light encoding value 1, the light level value 20 belongs to the light encoding value 2, and a light level value 30 belongs to the light encoding value 3. A light level value 12 that is stored in the memory 56 derives after multiplication of the correction factor K1 by the light level value 10 originally belonging to the light encoding value 1. By multiplication with the correction factor K2, the light level value 20 becomes the light level value 21. The light encoding value 3 becomes the light level value 31 by multiplication with the correction factor K3. When printing, the conversion and correction unit 24 then allocates the light level values 0, 12, 21 or, respectively, 31 to the light encoding values 0, 1, 2 or, respectively, 3. Modified light encoding signals 26 that lead to the emission of modified illumination energies thereby derive in the character generator 22.

FIG. 4 shows equations (1), (2) and (3) that are employed in the determination of the corrected illumination energies HK1, HK2 and HK3. The equations (1), (2) and (3) are explained below, likewise with reference to FIG. 2.

Equation (1) reads:

$$VD(K,T,H) = (VC-VLIM)\cdot\exp(-K\cdot T\cdot H) + VLIM, \qquad (1)$$

whereby
VC is the charge potential of the photoconductor in volts,
VD is the discharge potential of the photoconductor in volts,
VLIM is the lowest obtainable discharge potential in volts,
H is the illumination energy in $\mu$Ws/cm$^2$,
T is the currently acquired temperature of the photoconductor in ° C.,
K is the photoconductor class in cm$^2$/($\mu$Ws° C.), and
exp is the exponential function.

Equation (1) is an approximation for the respective characteristic of the photoconductor. The characteristics KLB, KL1 and KL2 in FIG. 2 differ from one another on the basis of the photoconductor class K. Equation (2) arises by reformulating Equation (1) according to the photoconductor class K:

$$K(VD, T, H) = \frac{1}{T\cdot H}\ln\left(\frac{VC-VLIM}{VD-VLIM}\right), \qquad (2)$$

whereby
ln is the logarithm function.

When a standard illumination energy HS is prescribed for the illumination energy H and, following illumination of the photoconductor with this illumination energy HS, the arising discharge potential VD as well as the temperature T of the photoconductor are acquired, then all quantities on the right side of Equation (2) are known and the photoconductor class K can be calculated. Alternatively, tables can be employed wherein photoconductor classes K calculated once for specific values of VD, T and H are stored.

When Equation (1) is reformulated according to the illumination energy H, then Equation (3) derives:

$$H(VD, K, T) = \frac{1}{T \cdot K} \ln\left(\frac{VC - VLIM}{VD - VLIM}\right). \quad (3)$$

After the photoconductor class K has been determined, the corrected illumination energies HK1, HK2 and HK3 can be determined from Equation (3) in that the potentials V1, V2 and V3 are successively inserted for the discharge potential VD. Subsequently, the correction factors K1 through K3 are determined by division. Prepared tables can thereby also be employed in order to implement the determination of the corrected illumination energies HK1, HK2 and HK3 fast.

FIG. 5 shows a further potential/illumination energy diagram on whose abscissa axis 60 the illumination energy is eroded [sic] in $\mu Ws/cm^2$ and on whose ordinate axis 62 the photoconductor potential is eroded [sic] in volts. The reference characteristic KLB is modified to a reference characteristic KLB' by the prescription of an operator. For example, let the operator modify or, respectively, correct the standard inkings of the macro-cells that derive given employment of the reference characteristic KLB. The width of fine written characters, lines and dots is to ensue deviating from the width in a standard inking. According to the prescription of the operator, the charge potential VC of 500 volts is boosted to a charge potential VC1 of 600 V. Instead of the potentials V1, V2 and V3, potentials V1', V2' and V3' are prescribed. The determination of the current characteristic KL1' of the photoconductor ensues as described above with reference to FIG. 2. Subsequently, the corrected illumination energies HK1', HK2' and HK3' are determined, likewise according to the above-explained method. The potentials V1', V2' and V3' are shifted toward higher potentials compared to the potentials V1, V2 and V3. Given a development of the discharged photoconductor areas (DAD—discharge area development), this means that the planes of section of the potential troughs are constricted with the development threshold. Finer print elements or, respectively, toner areas 36 arise. Given raster areas, this means that the raster tonal value decreases and, thus, the raster areas become lighter. When, in contrast thereto, the charged photoconductor areas are developed (CAD—charged area development), then broader print elements arise. The respectively opposite effects arise given a reduction of the charge potential VC.

In another exemplary embodiment, the inking properties are regulated via the development threshold in addition to the charge potential VC, in that an auxiliary voltage VBias of the developer station is set to various values. An increase of the auxiliary voltage VBias of the developer station yields broader print elements given DAD and finer print elements given CAD. When the auxiliary voltage VBias is lowered, respectively opposite effects arise. The variation of the auxiliary voltage VBias effects a variation of the development characteristics that indicates [sic] the relationship of photoconductor potential and toner deposit.

As in the exemplary embodiments explained above on the basis of FIGS. 1 through 5, only the upper section of the photoconductor characteristic is employed in fast printing processes because the illumination energies to be generated by the character generator are lower in this section and can be beamed out in shorter times. The photoconductor can therefore be moved past the LEDs of the character generator faster. The auxiliary potential VBias in the developer station must then lie clearly above the lowest photoconductor potential VLIM.

Figure 6:
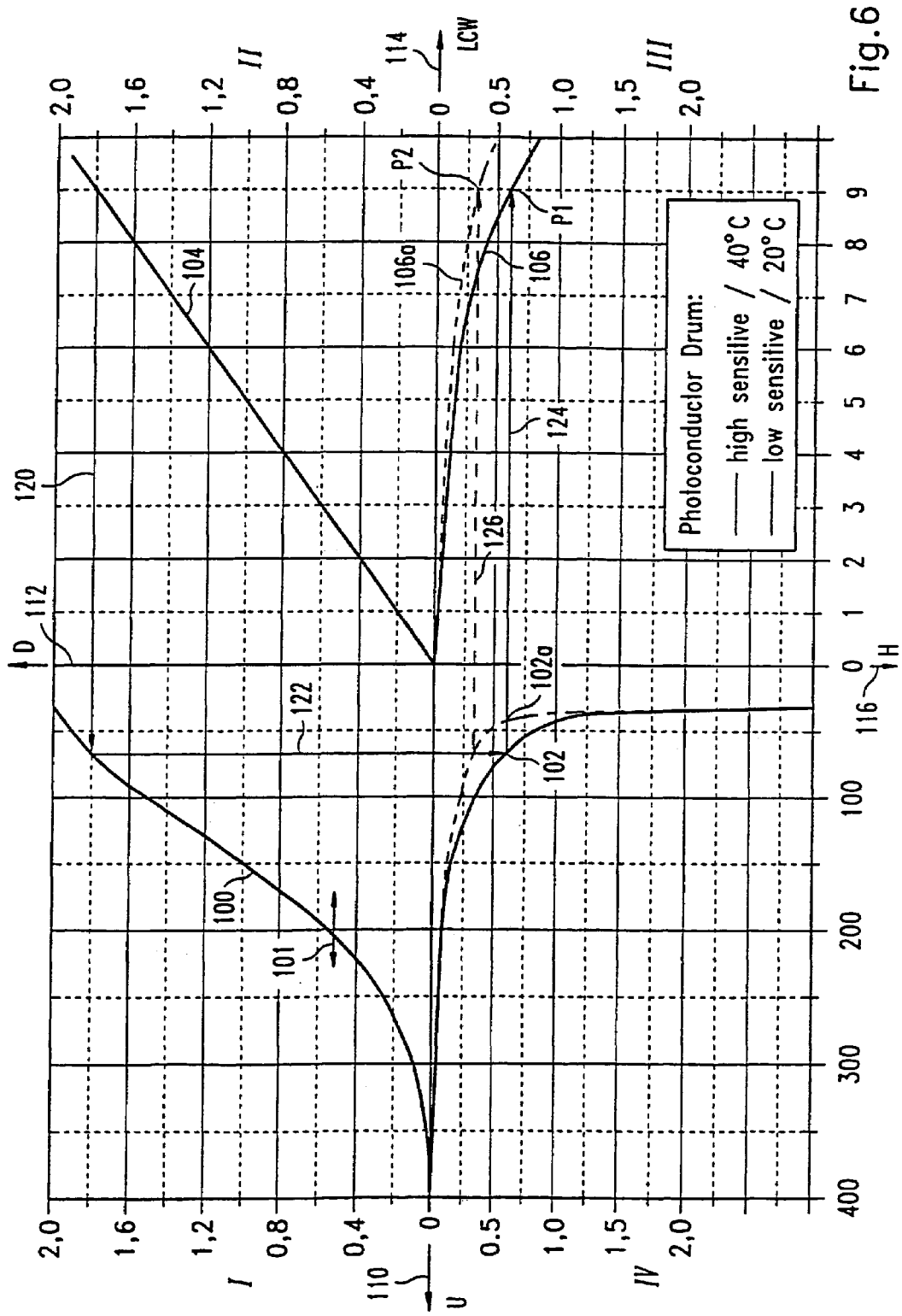

FIG. 6 shows a four-quadrant diagram with characteristics 100, 102, 102a, 104, 106 and 106a of the printing event. The upper left quadrant I shows a development characteristic 100 that indicates the relationship of the potential on the photoconductor and the toner deposit after the developing. The potential U of the photoconductor is therefore eroded [sic] on the abscissa axis 110 of quadrant I. The optical density D is eroded [sic] on the ordinate axis 112 of the quadrant I, this being a measure of the toner deposit. Given increase or, respectively, decrease of the toner concentration in a two-component toner, the discharge characteristic 100 shifts in the direction of a double arrow 101 toward the left or, respectively, toward the right. A constant toner concentration shall be assumed below, the development characteristic 100 belonging thereto.

The lower left quadrant IV shows a solid-line discharge characteristic 102 that indicates the relationship of illumination energy H and potential H on the photoconductor. The illumination energy is eroded [sic] on the ordinate axis 116 of the quadrant IV. The potential U is indicated on the abscissa axis 110 of the quadrant IV. The discharge characteristic 102 belongs to a photoconductor with the temperature 20° C. The curve of the discharge characteristic 102 essentially corresponds to the curve of the characteristic KLB explained on the basis of FIG. 2. A discharge characteristic 102a shown with broken lines belongs to the photoconductor given a temperature of 40° C. The discharge characteristic 102a is likewise shown in quadrant IV.

A print characteristic 104 that indicates a predetermined relationship of light encoding values LCW and optical density D or, respectively, toner deposit on the photoconductor is shown in the upper right quadrant II. The optical density D is indicated on the ordinate axis 112 of the quadrant II. The light encoding values LCW are eroded [sic] on an abscissa axis 114 of the quadrant II. The relationship prescribed by the print characteristic 104 is preferably linear, so that the optical density D likewise increases when the light encoding value LCW increases. However, the print characteristic 104 can also have a different predetermined curve in order to create additional degrees of freedom for the printing process.

Proceeding from the print characteristic 104, the corrected illumination energies HK can be determined with the assistance of the relationships indicated in the four-quadrant diagram. The determination of the corrected illumination energies HK shall be explained below with the assistance of a graphic construct. This construct, however, is automatically implemented in the printer device by a microprocessor that processes the commands of a program that are stored in a memory of the printer device and with which the corrected illumination energies HK can be calculated.

For example, the corrected illumination energy value HK9 for the light encoding value LCW=9 is determined proceeding from the value defined by the print characteristic 104 for the optical density D given the light encoding value LCW=9. With the assistance of the development characteristic 100 illustrated in quadrant I, a voltage U is determined from this value of the optical density D, see arrows 120 and 122. With the assistance of the value of potential U determined from the development characteristic 100, an illumination energy HK that is employed as corrected illumination energy HK9 for the light encoding value LCW=9 is read off from the discharge characteristic 102, see arrow 124.

The illumination energies H belonging to the light encoding values LCW are shown in quadrant III. Thus, the corrected illumination energy HK9 of approximately 0.6 $\mu$Ws/cm² belongs to the light encoding value LCW=9. A point P1 thus derives for the light encoding value LCW=9 given the illumination energy HK9=0.6 $\mu$Ws/cm².

When the corrected illumination energies HK for the other light encoding values LCW are determined in the same way with the assistance of the four-quadrant diagram, then an encoding characteristic 106 derives in quadrant III that indicates the relationship of light encoding values LCW and corrected illumination energies HK. The point P1 lies on the encoding characteristic 106.

When a photoconductor with the discharge characteristic 102*a* is employed in the printing event, the predetermined curve of the print characteristic 104 can nonetheless be achieved when the corrected illumination energies are re-determined. This is again explained with reference to the example of the light encoding value LCW=9. Proceeding from the print characteristic 104, the value of the optical density D belonging to the light encoding value LCW=9 is determined.

This value lies at approximately 1.8, see arrow 120. Subsequently, the appertaining potential U is read from the development characteristic 100 for this value of the optical density D=1.8, see arrow 122. This potential amounts to about 65 V, see arrow 122. Subsequently, the illumination energy H is read from the characteristic 102*a* for the potential U=65 V determined in this way. A corrected illumination energy HK9 of about 0.3 $\mu$Ws/cm² derives. When the corrected illumination energy HK9 determined in this way is entered in the quadrant III at a point P2, then one has the first point of the characteristic 106*a*, which indicates the relationship between light encoding values LCW and corrected illumination energies HK for the photoconductor with the characteristic 102*a*. In a similar way, the corrected illumination energies HK are determined for the other light encoding values LCW. The relationship between light encoding values LCW and corrected illumination energies HK illustrated with the encoding characteristic 106*a* derives.

In another exemplary embodiment, the development characteristic 100 is modified for achieving the print characteristic 104 in that the toner concentration is raised or, respectively, lowered. New degrees of freedom derive as a result thereof, these being particularly employed when the free selection of the corrected illumination energy values HK is limited.

In addition to the print characteristic 104 shown in FIG. 6, there is also a printing process characteristic (not shown) that indicates the relationship between illumination energy H and optical density D. Whereas the printing process characteristic is already fixed when the development characteristic 100 and the discharge characteristic 102 are defined, the print characteristic 104 can still be varied. For example, a curve is prescribed for the print characteristic 104 as explained above. The print characteristic 104 is thus designationally modified.

List of Reference Characters

10 printer device
12 interface
14 print data
16 print data unit
MP microprocessor
18 memory
20 light encoding data
22 character generator
LED light-emitting diode
0–3 light encoding values
HB1–HB3 reference illumination energy
24 conversion and correction unit
K1–K3 correction factor
HK1–HK3 corrected illumination energy
26 light encoding signal
28 light energy distribution
30 photoconductor
32 values of potential
34 development unit
36 toner regions
50 abscissa axis, illumination energy
52 ordinate axis, photoconductor potential
KLB reference characteristic
KL1,KL2 characteristic of the photoconductor
KLB' lowest obtainable discharge potential
54 broken line
V1–V3 potential
V7 potential
HB7 reference illumination energy
HK7 corrected illumination energy
K7 correction factor
56 memory
H illumination energy
T temperature of the photoconductor
K photoconductor class
HS standardized illumination energy
60 abscissa axis, illumination energy
62 ordinate axis, potential
VC,VC1 charge potential
V1'–V3' predetermined potential
DAD discharged area development
CAD charged are development
VBias auxiliary potential of the development device
100 development characteristic
101 double arrow
102,102*a* discharge characteristic
104 printing process characteristic
106,106*a* encoding characteristic
I–IV quadrant
110,114 abscissa
112,116 ordinate
P1,P2 point
D optical density
LCW light encoding values
120–126 arrow
U potential

What is claimed is:

1. A method for operation of an electrophotographic printer or copier device in which an optical character generator illuminates a photoconductor with at least one light source, comprising the steps of:
   generating light encoding data from print data of a print image, the light encoding data respectively contain one of at least three different light encoding values that are allocated to different reference illumination energy values;
   utilizing the reference illumination energy values for printing when the photoconductor has a predetermined reference discharge characteristic indicating a relationship of illumination energy and potential on the photoconductor;

considering a discharge characteristic indicating the relationship of illumination energy and potential on the photoconductor in a balancing event in a definition of corrected illumination energies;

determining in a balancing event the corrected illumination energy to be emitted by the character generator respectively for each of said at least three different light encoding values dependent on a deviation of the discharge characteristic from the reference discharge characteristic given a potential that belongs to the reference illumination energy employed according to the reference discharge characteristic given the respective light encoding value, wherein a value of the respective corrected illumination energy deviates all the more from a value of the reference illumination energy belonging to the same light encoding value the greater the deviation of the characteristics from one another is given the potential belonging to the respective light encoding value according to the reference discharge characteristic.

2. A method as claimed in claim 1, further comprising the step of:

determining one correction parameter for each of said at least three different light encoding values; and calculating the corrected illumination energy values for the appertaining light encoding values with said correction parameters.

3. A method as claimed in claim 1, further comprising the steps of:

acquiring the discharge characteristic completely or in points;

prescribing a photoconductor potential for each of said light encoding values; and determining the corrected illumination energy respectively from the discharge characteristic for said light encoding value for the predetermined potential.

4. A method as claimed in claim 3, further comprising the step of:

utilizing a mathematical model for the discharge characteristic of the photoconductor.

5. A method as claimed in claim 4, wherein said mathematical model is:

$$VD(K,T,H) = (VC - VLIM) \cdot \exp(-K \cdot T \cdot H) + VLIM, \quad (1)$$

wherein

VC is a charge potential of the photoconductor in volts,
VD is a discharge potential of the photoconductor in volts,
VLIM is a lowest obtainable discharge potential in volts,
H is an illumination energy in $\mu Ws/cm^2$,
T is a currently acquired temperature of the photoconductor in ° C.,
K is a photoconductor class in $cm^2/(\mu Ws° C.)$, and
exp is an exponential function.

6. A method as claimed in claim 1, further comprising the steps of:

determining said discharge characteristic completely or in points;

prescribing a photoconductor potential for at least one of said light encoding values;

determining said corrected illumination energy from the discharge characteristic for the predetermined potential; and determining the corrected illumination energies for other light encoding values by estimates.

7. A method as claimed in claim 6, further comprising the step of:

utilizing a mathematical model for the discharge characteristic of the photoconductor.

8. A method as claimed in claim 7, wherein said mathematical model is:

$$VD(K,T,H) = (VC - VLIM) \cdot \exp(-K \cdot T \cdot H) + VLIM, \quad (1)$$

wherein

VC is a charge potential of the photoconductor in volts,
VD is a discharge potential of the photoconductor in volts,
VLIM is a lowest obtainable discharge potential in volts,
H is an illumination energy in $\mu Ws/cm^2$,
T is a currently acquired temperature of the photoconductor in ° C.,
K is a photoconductor class in $cm^2/(\mu Ws° C.)$, and
exp is an exponential function.

9. A method as claimed in claim 1, further comprising the step of:

taking the discharge characteristic into consideration in at least one regulating or control event, including determining the corrected illumination energy for the light encoding value such that a potential predetermined for the light encoding value or a potential lying close to this potential arises on the photoconductor given an illumination according to the light encoding value and an appertaining corrected illumination energy.

10. A method as claimed in claim 1, further comprising the step of:

considering a development characteristic indicating a current relationship of potential on the photoconductor and toner deposit in said determining step of the corrected illumination energies and/or of further printing parameters.

11. A method as claimed in claim 1, further comprising the step of:

determining further printing parameters, including considering a development characteristic indicating a current relationship of potential on the photoconductor and toner deposit.

12. A method as claimed in claim 10, further comprising the steps of:

applying a plurality of toner marks with different rastering; and acquiring the toner deposits in the region of the toner marks.

13. A method as claimed in claim 12, wherein said step of acquiring utilizes a sensor to acquire the toner deposit in the region of the toner mark in integrating fashion.

14. A method as claimed in claim 1, further comprising the steps of:

applying at least one toner mark onto one of the photoconductor and a carrier material utilizing the corrected illumination energies;

acquiring a toner deposit in a region of the toner mark; and prescribing at least one further printing parameter that influences at least one of a development process and an illumination process dependent on the toner deposit.

15. A method as claimed in claim 14, wherein said step of acquiring is by one of an optical sensor and a capacitative measuring sensor.

16. A method as claimed in claim 14, further comprising the step of:

applying a plurality of toner marks with different rastering; and acquiring toner deposits in a region of the toner marks.

17. A method as claimed in claim 14, wherein said step of acquiring acquires the toner deposit in the region of the toner mark by a sensor in integrating fashion.

18. A method as claimed in claim 1, further comprising the step of:
considering only a section of at least one of the illumination characteristic and the development characteristic.

19. A method as claimed in claim 1, further comprising the step of:
automatically implementing the balancing event.

20. A method as claimed in claim 19, wherein said step of automatically implementing is performed after a printer or copier device is turned on.

21. A method as claimed in claim 19, wherein said step of automatically implementing is performed after longer printing pauses.

22. A method as claimed in claim 19, wherein said step of automatically implementing is performed after longer printer operation.

23. A method as claimed in claim 19, wherein said step of automatically implementing is performed demand of an operator.

24. A method as claimed in claim 1, further comprising the steps of:
prescribing a potential value that should occur on the photoconductor given illumination according to the respective light encoding value for each light encoding value; and
utilizing the illumination energy value determined by the discharge characteristic given the potential predetermined for the light encoding value as the corrected illumination energy for a light encoding value.

25. A method as claimed in claim 1, further comprising the step of:
utilizing the reference illumination energy value prescribed for the appertaining light encoding value for the determination of a corrected illumination value.

26. An electrophotographic printer or copier device, comprising:
an optical character generator that illuminates a photoconductor with at least one light source;
a print data unit that generates light encoding data with at least three different light encoding values from the print data of a print image, the light encoding values being allocated to different reference illumination energies, the reference illumination energy values being employed for printing when the photoconductor has a prescribed reference discharge characteristic indicating the relationship of illumination energy and potential on the photoconductor;
a drive unit for driving the light source dependent on the light encoding data; and
a correction unit in which a discharge characteristic indicating a relationship between illumination energy and potential on the photoconductor is taken into consideration in a determination of corrected illumination energies, the correction unit determining the corrected illumination energy for each of said at least three different light encoding values so that a value of a respective corrected illumination energy deviates all the more from a value of a reference illumination energy belonging to a same light encoding value the greater a deviation of the characteristic from the reference discharge characteristic is given a potential that belongs to the reference illumination energy employed for the respective light encoding value according to the reference discharge characteristic;
said drive unit driving the light source dependent on the corrected illumination energies.

* * * * *